(12) United States Patent
    Zvorsky

(10) Patent No.: US 11,738,818 B1
(45) Date of Patent: Aug. 29, 2023

(54) INTEGRATED HAND GUARD AND LIGHTING SYSTEM

(71) Applicant: Stephen Zvorsky, Simi Valley, CA (US)

(72) Inventor: Stephen Zvorsky, Simi Valley, CA (US)

(*) Notice: Subject to any disclaimer, the term of this patent is extended or adjusted under 35 U.S.C. 154(b) by 0 days.

(21) Appl. No.: 18/090,716

(22) Filed: Dec. 29, 2022

Related U.S. Application Data

(60) Provisional application No. 63/294,826, filed on Dec. 29, 2021.

(51) Int. Cl.
*B62J 6/00* (2020.01)
*B62J 6/02* (2020.01)
*B62J 27/00* (2020.01)

(52) U.S. Cl.
CPC . *B62J 6/00* (2013.01); *B62J 6/02* (2013.01); *B62J 27/00* (2013.01)

(58) Field of Classification Search
CPC ................. B62J 6/00; B62J 6/02; B62J 27/00
USPC ................................................. 362/473, 474
See application file for complete search history.

(56) References Cited

U.S. PATENT DOCUMENTS

| | | | | |
|---|---|---|---|---|
| 5,795,050 A | * | 8/1998 | Carter | B62J 6/029 |
| | | | | 362/474 |
| 7,481,560 B1 | * | 1/2009 | Jaw | B62J 6/056 |
| | | | | 340/432 |
| 8,387,939 B2 | * | 3/2013 | Ford | F16M 13/02 |
| | | | | 362/474 |
| 11,584,292 B1 | * | 2/2023 | Lin | B62K 21/26 |
| 2007/0062326 A1 | * | 3/2007 | Laivins | B62J 23/00 |
| | | | | 74/551.8 |
| 2007/0256514 A1 | * | 11/2007 | Laivins | B62J 23/00 |
| | | | | 74/551.8 |
| 2008/0203762 A1 | * | 8/2008 | Shimanski | B62J 23/00 |
| | | | | 296/180.1 |
| 2012/0234129 A1 | * | 9/2012 | Adan | B62J 23/00 |
| | | | | 74/551.8 |

* cited by examiner

Primary Examiner — Lau K Tso

(57) ABSTRACT

An integrated hand guard lighting system for use with various mountain bike and motor sports vehicles. The combination lighting apparatus and hand guard comprises a mount for releasably coupling to a handlebar and a housing coupled to the mount, the housing having a blade-shaped shield portion that is spaced apart a specified distance from the handlebar to allow for a user to grip the handlebar. The blade-shaped shield portion of the housing includes a frontal surface configured to extend along a gripping region of the handlebar to shield the user's hand while gripping the handlebar, and includes an illumination source disposed at the frontal surface to illuminate a path outward in a direction away from the gripping region.

20 Claims, 5 Drawing Sheets

INTEGRATED HAND GUARD AND LIGHTING SYSTEM

CROSS-REFERENCE TO RELATED APPLICATIONS

This application claims priority to, and the benefit of, U.S. provisional patent application Ser. No. 63/294,826 filed on Dec. 29, 2021, incorporated herein by reference in its entirety.

BACKGROUND

Technical Field

Embodiments of the present description relate to lighting systems. More specifically, embodiments of the present description relate to handle-bar mount lighting systems.

Background Discussion

Hand guards are used in many motor and mountain biking sports to protect the user's hand while gripping handlebars in operation of the bike or vehicle. Lights are also available to assist the user or rider during low-light or night activities. Both lights and hand guards have handlebar mounts, however the inclusion of both can lead to non-optimal lighting position and crowding with other components that are typically present on modern handlebars (e.g. brakes, shifters, seat-dropper levers suspension lockouts, etc.).

SUMMARY OF THE DISCLOSURE

An aspect of the present description is an integrated hand guard lighting system for use with various mountain bike and motor sports vehicles. In one embodiment, a lighting apparatus comprises a mount for releasably coupling to a handlebar and a housing coupled to the mount, the housing having a blade-shaped shield portion that is spaced apart a specified distance from the handlebar so as to allow for a user to grip the handlebar. The blade-shaped shield portion of the housing includes a frontal surface configured to extend along a gripping region of the handlebar to shield the user's hand while gripping the handlebar, and includes an illumination source disposed at the frontal surface to illuminate a path outward in a direction away from the gripping region.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

The description provided below is directed to various embodiments of an integrated hand guard lighting system for use with various mountain bike and motor sports vehicles. While the description and figures provided herein are shown with a mount for use with a bicycle handlebars, it is appreciated that the embodiment illustrated in of FIG. 1 through FIG. 5 may be implemented and adapted for use with a number of vehicles and recreational devices that utilize handlebars and the need for providing hand protection from impact or obstacles. For example, embodiments may be implemented for use with motorcycles, other types of vehicles or all-terrain vehicles (ATVs).

Figure 1:
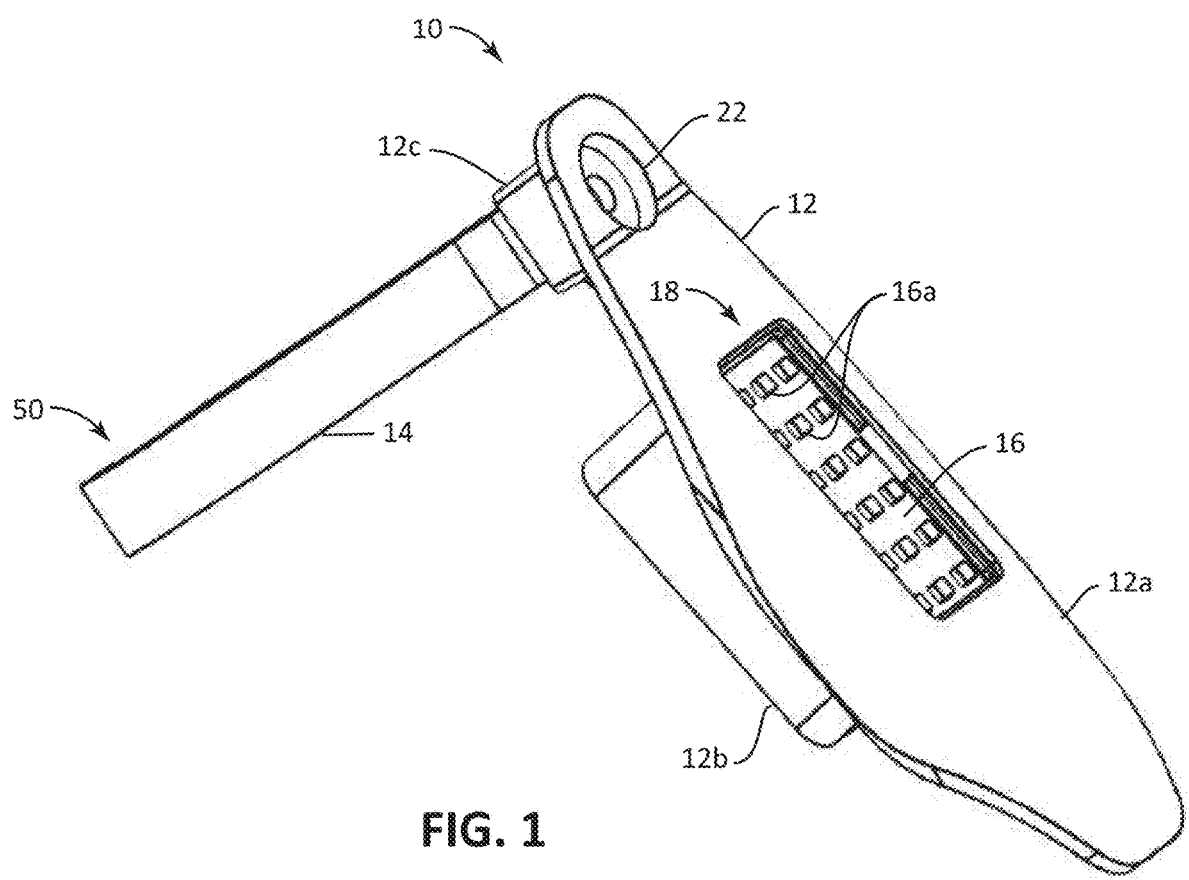
FIG. 1 is a perspective view of the integrated hand guard lighting system in accordance with the technology of the present description.

Referring now to FIG. 1, a perspective view of an integrated hand guard lighting device 10 the present description is shown. Hand guard lighting device 10 comprises a housing 12 in the form of a blade-shaped shield portion 12a that houses a light or illumination source 16. In one embodiment, the illumination source 16 comprises an array of illumination sources 16a (e.g. light—emitting diodes (LEDs)) that are positioned or otherwise attached to the housing 12 within cavity 18, and are located such that the LEDs 16a are exposed or are capable of generating light from a frontal surface of the blade-shaped shield portion 12a so as to illuminate a path outward in a direction away from frontal surface.

Housing 12 may also include an aft compartment section 12b allowing for disposition of various components of the device, and a receiving portion 12c for attachment of a standoff 14 that sets the blade portion 12a a set distance away from the mounting surface (e.g. see handlebar 40 in FIG. 3-FIG. 5) and user's hand when positioned on a gripping region (e.g. grip 42) of the handlebar 40. In the embodiment illustrated in FIG. 1, the standoff 14 is releasably coupled to the housing 12 by insertion into a recess (not shown) in the receiving portion 12c and is secured with a fastener (not shown), the head of which is may be set in bore 22 such that the fastener is at least flush with or does not protrude from the frontal surface of the blade-shaped shield portion 12a. Other means of attachment, (e.g. adhesives or the like) between the standoff 14 and housing 12 are contemplated. It is also appreciated that the standoff 14 and housing 12 may be combined to be one integral structure.

In one embodiment, the housing 12 and/or standoff 14 are constructed of a polymeric compound such as a lightweight thermoplastic compound that is compact and resistant to breaking upon impact. The standoff 14 includes a universal coupling or mount 50 that allows for releasable attachment to a handlebar, without removing your grips or other controls.

Figure 2:
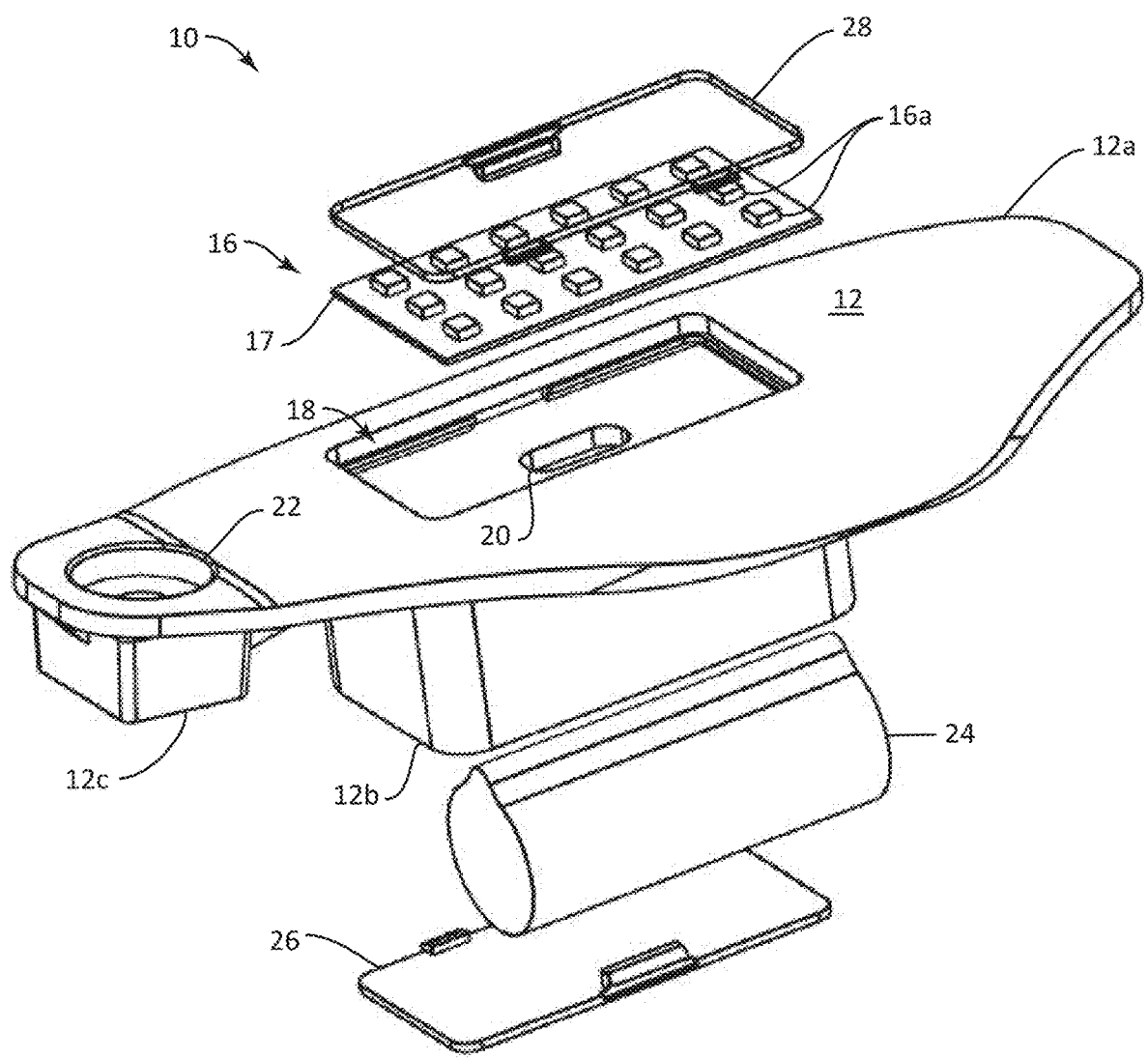
FIG. 2 is an exploded perspective view illustrating the various components of the integrated hand guard lighting system of FIG. 1, with standoff removed.

As shown in FIG. 1, the illumination source 16 comprises a rectangular array (e.g. 3×6) of LEDs 16a arranged on a substrate, board (e.g., PCB, etc.) 17 (see FIG. 2). It is appreciated that illumination source 16 may comprise any type of light source and be arranged in a variety of different shapes or patterns, and may also be positioned on a flexible substrate, or integrated in/on shield portion 12a to conform to a non-planar shape or surface.

Referring now to FIG. 2, an exploded perspective view is shown illustrating the various components of the integrated hand guard lighting device 10. In one embodiment, a power source 24 (e.g. battery or the like device) is disposed within compartment section 12b and may be accessed via a removable housing cap 26. The battery 24 is electrically coupled to illumination source 16 via wiring or leads (not shown) that pass through an aperture 20 connecting recess 18 with aft compartment section 12b. A lens or cover 28 may also be disposed over illumination source 16, and is preferably translucent or opaque to allow light from illumination source to pass through. Cover 28 may also have specific optical properties, e.g. light dispersion, refraction, reflection, shaping, etc.

Battery 24 provides power to illumination source 16, and may be rechargeable, disposable or other variation known in the art. The battery may also be located outside (or supplemented with another battery) at a distance from housing 12, such as a location at the stem, head tube, or other central location on the bike (e.g. see external battery 70 extended leads 72 shown in FIG. 5) so as to remotely power both left and right hand guard lighting device 10. Battery 24 may be coupled to illumination source 16 via logic or other circuitry (not shown) that allows for control of illumination from the illumination source (e.g. via an input button, not shown) for various functionality (e.g. "on", "off" illumination intensity or power draw from battery). Logic or other circuitry may also be configured to control charging or recharging of the battery 24. A meter (e.g. analog or digital display, indicator light, or the like, not shown) may also be coupled to the battery 24, light 16 and logic or processor (not shown) to provide indication of battery life, charge, intensity or other functionality.

Figure 3:
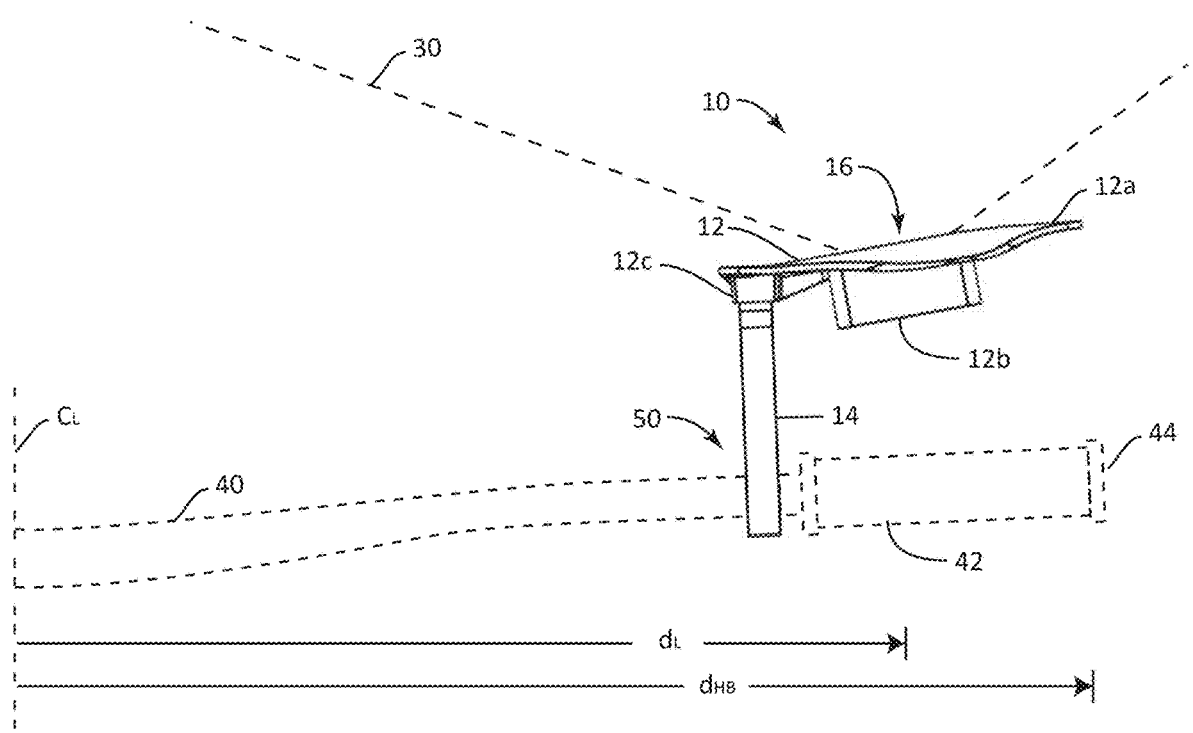
FIG. 3 is a top view of the integrated hand guard lighting system of FIG. 1 mounted on the right side of a mountain bike handlebar.

FIG. 3 shows a top view of the integrated hand guard lighting device 10 mounted on the right side of a mountain bike handlebar 40. In typical operating mode, hand guard lighting system of 10 is one of a pair of hand guards that are disposed symmetrically and just proximal to distal left and right ends 44 of the handlebar 40. For example, each of the hand guard lighting devices 10 is mounted proximal to grips 42 and are clamped to the handlebar 40 via universal mount 50 such that the shields 12a are offset away from grips 42 and extend in a cantilevered fashion along the gripping region (e.g. grip 42) of the handlebars toward distal end 44 to provide room/protection for the user's hands and/or other components of the bike (e.g. brake levers, not shown).

Figure 4:
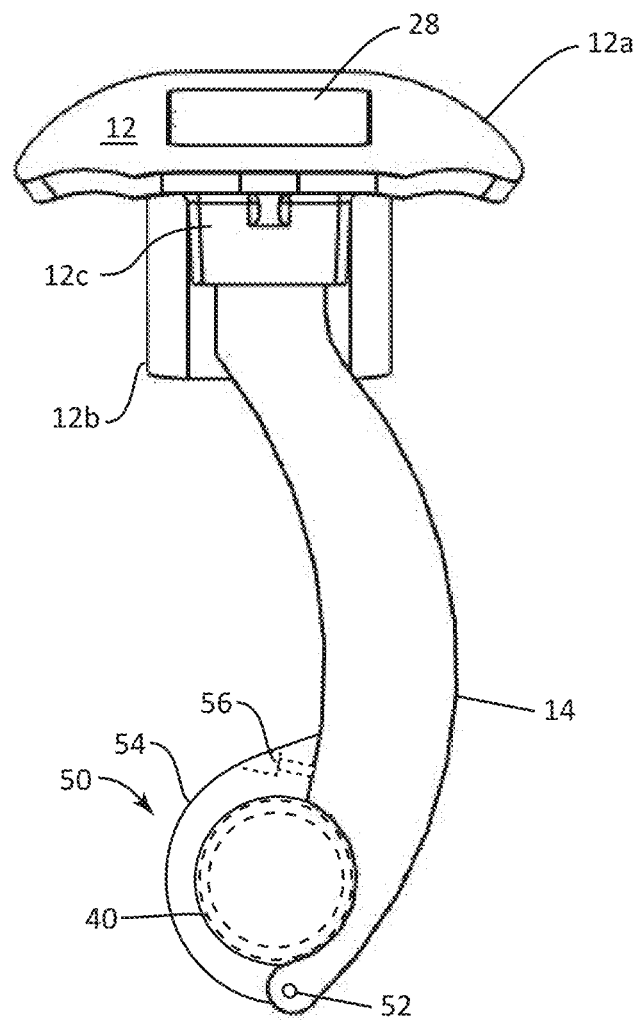
FIG. 4 is a side view of the integrated hand guard lighting system of FIG. 1, the side view taken along the central axis of the bike handlebar illustrated in FIG. 3.

FIG. 4 is a side view of the integrated hand guard lighting device 10 taken along an axis of the mountain bike handlebar 40, and further illustrates a handle-bar mount configuration. As illustrated in FIG. 4, the distal end of the standoff 14 comprises a universal mount 50 in the form of a separable clamshell configuration with pivoting clamp or arm 54 that rotates about hinge 52 to clamp down on in a secured position during use, or release from the handlebar 40 if needed for maintenance repositioning or replacement. A bolt (not shown) or like fastener and through hole 56 may be used to provide clamping force on the handlebar 40 and secure open end of arm 54 to the standoff body 14.

Figure 5:
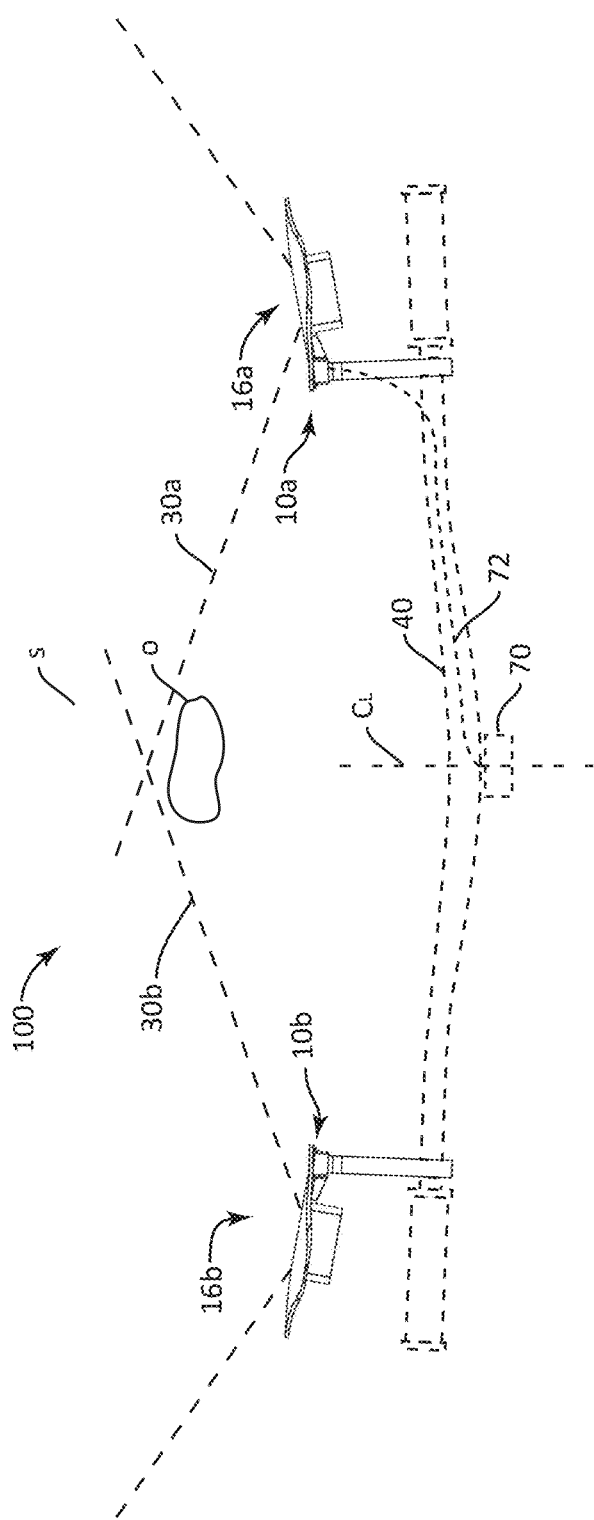
FIG. 5 is a top view of an integrated hand guard lighting system incorporating left and right lighting devices on handlebars.

As illustrated in FIG. 3 and FIG. 5, the hand guard lighting device 10 mounting configuration provides a location of the illumination source 16 on the shield portion 12a that is maximally spaced apart from the centerline $C_L$ of the handlebars, e.g. such that the illumination source is at a distance $d_L$ that is close to or at the distance $d_{HB}$ from the centerline $C_L$ to the handlebar distal end 44. Thus, the illuminated beam 30 (which may vary in swath and intensity) from each illumination source 16 is at or close to that maximum allowable separation that is available for the specific handlebar length, e.g. the separation ($2 \times d_L$) between left and right illumination sources 16a/16b is close to the handlebar length ($2 \times d_{HB}$).

Furthermore, when the lighting devices 10 are incorporated as a lighting system 100 having a pair of lighting devices (e.g., right-mounted lighting device 10a and left-mounted lighting device 10b shown in FIG. 5), a number of unique benefits are achieved that are distinct from typical lighting arrangements (which are generally centrally located). For example, the combination of beams 30a and 30b in combination provide a wider overall beam swath, e.g. via the combined-spaced apart swath from left and right illumination sources 16. Additionally, the spaced—apart orientation or perspective at or near distal ends 44 provides an angular perspective that can help minimize or diminish shadows from obstacles o (e.g. rocks, trees, foliage, other riders, etc.). As shown in FIG. 5, the shadow s that would be cast/generated from a single light mounted at or near the centerline $C_L$ of the handlebars 40 is removed or at least minimized as a result of the spaced-apart dual beams 30a and 30b.

It is appreciated that the shape or angular swath of beams 30a and 30b may vary from that depicted in FIG. 3 and FIG. 5. Furthermore, illumination source 16 and/or lens or cover 28 may comprise one or more of light conditioning, shaping, reflection, magnification, dispersion, etc. to optimize the light beams 30a and 30b singly or in combination.

As also shown in FIG. 3, the shield portion 12a is shaped and sized to substantially span the grip 42 upon which the user's hand is placed while gripping the handlebars to operating brakes (not shown) or otherwise riding or steering the bike. Thus, shield portion 12a acts to guard the hand from potential impact with brush, trees, or other obstacles that may be present while operating the bike.

The hand guard lighting device 10 as shown in FIG. 1 through FIG. 5 is configured to adapt to a number of differing handlebar types and sizes, and may be shaped and sized according to use with the type of vehicle (e.g. motorcycle vs. mountain bike).

From the description herein, it will be appreciated that that the present disclosure encompasses multiple embodiments which include, but are not limited to, the following:

1. A lighting apparatus, comprising: a mount for releasably coupling to a handlebar; and a housing coupled to the mount, the housing having a blade-shaped shield portion that is spaced apart a specified distance from the handlebar so as to allow for a user to grip the handlebar; the blade-shaped shield portion of the housing comprising a frontal surface configured to extend along a gripping region of the handlebar to shield the user's hand while gripping the handlebar; the blade-shaped shield portion of the housing comprising an illumination source disposed at the frontal surface so as to illuminate a path outward in a direction away from the gripping region.

2. The apparatus, system or method of any of the preceding or subsequent embodiments, wherein the housing is offset from the mount via a standoff that terminates at the mount.

3. The apparatus, system or method of any of the preceding or subsequent embodiments, wherein the illumination source comprises an array of LEDs spanning across a portion of the frontal surface.

4. The apparatus, system or method of any of the preceding or subsequent embodiments, wherein the housing is configured to house a battery for providing power to the illumination source.

5. A lighting system comprising a pair of lighting apparatus of any of the preceding or subsequent embodiments, configured to be mounted at spaced-apart locations on the handlebar.

6. A method of providing illumination from a hand guard using the lighting apparatus, system or method of any of the preceding or subsequent embodiments.

7. A lighting apparatus, comprising: a mount for releasably coupling to a handlebar; and a housing coupled to the mount, the housing having a blade-shaped shield portion that is spaced apart a specified distance from the handlebar so as to allow for a user to grip the handlebar; the blade-shaped shield portion of the housing comprising a frontal surface configured to extend along a gripping region of the handlebar, the frontal surface shaped to shield the user's hand while gripping the handlebar; and wherein the blade-shaped shield portion of the housing comprises an illumination source disposed at the frontal surface so as to illuminate a path outward in an opposing direction away from the gripping region.

8. The apparatus, system or method of any of the preceding or subsequent embodiments, wherein the housing is configured to mount at a proximal location of the handlebar to allow for the blade-shaped shield portion to extend cantilevered toward a distal end of the handlebar.

9. The apparatus, system or method of any of the preceding or subsequent embodiments, wherein the housing is offset from the mount via a standoff that terminates at the mount.

10. The apparatus, system or method of any of the preceding or subsequent embodiments, wherein the illumination source comprises an array of LEDs spanning across a portion of the frontal surface.

11. The apparatus, system or method of any of the preceding or subsequent embodiments, wherein the housing is configured to house a power source for providing power to the illumination source.

12. The apparatus, system or method of any of the preceding or subsequent embodiments, wherein the illumination source is disposed within a recess of the frontal surface of the blade-shaped shield portion.

13. The apparatus, system or method of any of the preceding or subsequent embodiments, wherein the housing further comprises a battery recess disposed open to and behind the recess of the illumination source from the frontal surface.

14. The apparatus, system or method of any of the preceding or subsequent embodiments, wherein a light beam emitted by the illumination source is shaped to act in cooperation with a second light beam of a second lighting apparatus disposed on an opposing end of the handlebar.

15. The apparatus, system or method of any of the preceding or subsequent embodiments, wherein the first and second light beams cooperate to widen an overall light beam emitted from the handlebar.

16. The apparatus, system or method of any of the preceding or subsequent embodiments, wherein the first and second light beams are spaced apart so as to minimize shadows dispersed from the illumination from the handlebar.

17. A lighting system, comprising: a first lighting device comprising a right mount for releasably coupling to a right side of a handlebar, and a housing having a blade-shaped shield portion extending toward a right distal end of the handlebar at a spaced-apart distance from the handlebar so as to allow for a user to grip the handlebar, the blade-shaped shield portion of the housing comprising a frontal surface configured to extend along a gripping region of the handlebar, the frontal surface shaped to shield the user's right hand while gripping the handlebar, wherein the blade-shaped shield portion of the housing comprises an illumination source disposed at the frontal surface so as to illuminate a first beam outward in an opposing direction away from the gripping region; and a second lighting device comprising one or more components substantially mirroring the first lighting device for releasably coupling to a right side of the handlebar to illuminate a second beam outward from the handlebar in cooperation with the first beam.

18. The apparatus, system or method of any of the preceding or subsequent embodiments, wherein the housing is configured to mount at a proximal location of the handlebar to allow for the blade-shaped shield portion to extend cantilevered toward a distal end of the handlebar.

19. The apparatus, system or method of any of the preceding or subsequent embodiments, wherein the housing is offset from the mount via a standoff that terminates at the mount.

20. The apparatus, system or method of any of the preceding or subsequent embodiments, wherein the illumination source comprises an array of LEDs spanning across a portion of the frontal surface.

21. The apparatus, system or method of any of the preceding or subsequent embodiments, wherein the housing is configured to house a power source for providing power to the illumination source.

22. The apparatus, system or method of any of the preceding or subsequent embodiments, wherein the illumination source is disposed within a recess of the frontal surface of the blade-shaped shield portion.

23. The apparatus, system or method of any of the preceding or subsequent embodiments, wherein the housing further comprises a battery recess disposed open to and behind the recess of the illumination source from the frontal surface.

24. The apparatus, system or method of any of the preceding or subsequent embodiments, wherein the first and second light beams cooperate to widen an overall light beam emitted from the handlebar.

25. The apparatus, system or method of any of the preceding or subsequent embodiments, wherein the first and second light beams are spaced apart so as to minimize shadows dispersed from the illumination from the handlebar.

26. A hand guard, comprising: a mount for releasably coupling to a handlebar; and a housing coupled to the mount, the housing having a blade-shaped shield portion that is spaced apart a specified distance from the handlebar to allow for a user to grip the handlebar; the blade-shaped shield portion of the housing comprising a frontal surface configured to extend along a gripping region of the handlebar, the frontal surface shaped to shield the user's hand while gripping the handlebar; wherein the housing is coupled to the mount at a proximal location of the handlebar to allow for the blade-shaped shield portion to extend cantilevered across at least a portion of the gripping region toward a distal end of the handlebar; wherein the blade-shaped shield portion of the housing comprises an illumination source disposed at the frontal surface so as to illuminate a path outward in an opposing direction away from the gripping region.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

In addition to any other claims, the applicant(s)/inventor(s) claim each and every embodiment of the technology described herein, as well as any aspect, component, or element of any embodiment described herein, and any combination of aspects, components or elements of any embodiment described herein.

What is claimed is:

1. A lighting apparatus, comprising:
a mount for releasably coupling to a handlebar; and
a housing coupled to the mount, the housing having a blade-shaped shield portion that is spaced apart a specified distance from the handlebar so as to allow for a user to grip the handlebar;
the blade-shaped shield portion of the housing comprising a frontal surface configured to extend along a gripping region of the handlebar, the frontal surface shaped to shield the user's hand while gripping the handlebar; and
wherein the blade-shaped shield portion of the housing comprises an illumination source disposed at the frontal surface so as to illuminate a path outward in an opposing direction away from the gripping region.

2. The lighting apparatus of claim 1, wherein the housing is configured to mount at a proximal location of the handlebar to allow for the blade-shaped shield portion to extend cantilevered toward a distal end of the handlebar.

3. The lighting apparatus of claim 2, wherein the housing is offset from the mount via a standoff that terminates at the mount.

4. The lighting apparatus of claim 1, wherein the illumination source comprises an array of LEDs spanning across a portion of the frontal surface.

5. The lighting apparatus of claim 1, wherein the housing is configured to house a power source for providing power to the illumination source.

6. The lighting apparatus of claim 1, wherein the illumination source is disposed within a recess of the frontal surface of the blade-shaped shield portion.

7. The lighting apparatus of claim 6, wherein the housing further comprises a battery recess disposed open to and behind the recess of the illumination source from the frontal surface.

8. The lighting apparatus of claim 1, wherein a light beam emitted by the illumination source is shaped to act in cooperation with a second light beam of a second lighting apparatus disposed on an opposing end of the handlebar.

9. The lighting apparatus of claim 8, wherein the first and second light beams cooperate to widen an overall light beam emitted from the handlebar.

10. The lighting apparatus of claim 9, wherein the first and second light beams are spaced apart so as to minimize shadows dispersed from the illumination from the handlebar.

11. A lighting system, comprising:
a first lighting device comprising a right mount for releasably coupling to a right side of a handlebar, and a housing having a blade-shaped shield portion extending toward a right distal end of the handlebar at a spaced-apart distance from the handlebar so as to allow for a user to grip the handlebar, the blade-shaped shield portion of the housing comprising a frontal surface configured to extend along a gripping region of the handlebar, the frontal surface shaped to shield the user's right hand while gripping the handlebar, wherein the blade-shaped shield portion of the housing comprises an illumination source disposed at the frontal surface so as to illuminate a first beam outward in an opposing direction away from the gripping region; and
a second lighting device comprising one or more components substantially mirroring the first lighting device for releasably coupling to a right side of the handlebar to illuminate a second beam outward from the handlebar in cooperation with the first beam.

12. The lighting system of claim 11, wherein the housing is configured to mount at a proximal location of the handlebar to allow for the blade-shaped shield portion to extend cantilevered toward a distal end of the handlebar.

13. The lighting system of claim 12, wherein the housing is offset from the mount via a standoff that terminates at the mount.

14. The lighting system of claim 11, wherein the illumination source comprises an array of LEDs spanning across a portion of the frontal surface.

15. The lighting system of claim 11, wherein the housing is configured to house a power source for providing power to the illumination source.

16. The lighting system of claim 12, wherein the illumination source is disposed within a recess of the frontal surface of the blade-shaped shield portion.

17. The lighting system of claim 16, wherein the housing further comprises a battery recess disposed open to and behind the recess of the illumination source from the frontal surface.

18. The lighting system of claim 11, wherein the first and second light beams cooperate to widen an overall light beam emitted from the handlebar.

19. The lighting system of claim 18, wherein the first and second light beams are spaced apart so as to minimize shadows dispersed from the illumination from the handlebar.

20. A hand guard, comprising:
a mount for releasably coupling to a handlebar; and
a housing coupled to the mount, the housing having a blade-shaped shield portion that is spaced apart a specified distance from the handlebar to allow for a user to grip the handlebar;
the blade-shaped shield portion of the housing comprising a frontal surface configured to extend along a gripping region of the handlebar, the frontal surface shaped to shield the user's hand while gripping the handlebar;
wherein the housing is coupled to the mount at a proximal location of the handlebar to allow for the blade-shaped shield portion to extend cantilevered across at least a portion of the gripping region toward a distal end of the handlebar; and
wherein the blade-shaped shield portion of the housing comprises an illumination source disposed at the frontal surface so as to illuminate a path outward in an opposing direction away from the gripping region.

* * * * *